United States Patent
Glunt et al.

(10) Patent No.: US 11,299,656 B2
(45) Date of Patent: Apr. 12, 2022

(54) LIQUID ADHESIVE CONCENTRATE

(71) Applicant: Ductmate Industries, Inc., Charleroi, PA (US)

(72) Inventors: David Michael Glunt, Greensburg, PA (US); Paris T. Daniel, Brentwood, PA (US)

(73) Assignee: DMI Companies, Inc., Charleroi, PA (US)

( * ) Notice: Subject to any disclaimer, the term of this patent is extended or adjusted under 35 U.S.C. 154(b) by 293 days.

(21) Appl. No.: 16/535,684

(22) Filed: Aug. 8, 2019

(65) Prior Publication Data

US 2020/0048510 A1    Feb. 13, 2020

Related U.S. Application Data

(60) Provisional application No. 62/716,438, filed on Aug. 9, 2018.

(51) Int. Cl.
| | | |
|---|---|---|
| *C09J 123/08* | (2006.01) | |
| *C09J 11/06* | (2006.01) | |
| *C09J 11/08* | (2006.01) | |
| *C09J 129/14* | (2006.01) | |

(52) U.S. Cl.
CPC ......... *C09J 123/0853* (2013.01); *C09J 11/06* (2013.01); *C09J 11/08* (2013.01); *C09J 129/14* (2013.01)

(58) Field of Classification Search
None
See application file for complete search history.

(56) References Cited

U.S. PATENT DOCUMENTS

| | | | | |
|---|---|---|---|---|
| 2015/0230457 | A1* | 8/2015 | Gandhi | A61P 1/00 514/372 |
| 2016/0298003 | A1* | 10/2016 | Alsoryai | C09J 11/04 |
| 2018/0135242 | A1* | 5/2018 | Melchin | C09D 123/0853 |

OTHER PUBLICATIONS

Product Information Sheet for Coadis 173. (Year: 2017).*

* cited by examiner

*Primary Examiner* — Robert T Butcher
(74) *Attorney, Agent, or Firm* — The Webb Law Firm

(57) ABSTRACT

Provided herein are compositions and methods of preparing a liquid adhesive concentrate and a liquid adhesive formulation for use as an adhesive in installing insulation on the outside or inside surface of a duct or ductwork.

17 Claims, No Drawings

LIQUID ADHESIVE CONCENTRATE

CROSS REFERENCE TO RELATED APPLICATIONS

This application claims priority to U.S. Provisional Application No. 62/716,438 filed Aug. 9, 2018, entitled "Liquid Adhesive Concentrate," the content of which is incorporated by reference herein.

BACKGROUND OF THE INVENTION

Ducts are used to transport heated or cooled air, or other gasses, from one place to another. Ducts are typically manufactured from sheet metal material and formed into the desired shape by joining ends of the sheet metal by a mechanism that allows interlocking of the two ends.

Often, insulation is installed on the outside or inside surface of a duct or ductwork in order to maximize the efficiency of the heating or cooling system containing the ductwork. Insulation will minimize loss of the hot or cool air to the outside environment and promote transportation of the air within the duct system. A water-based adhesive is typically employed to adhere the insulation to the ductwork. Weld pins may be additionally used to secure the insulation to the ductwork. Successful duct liner adhesives have good "wet tack" and short dry times and adheres insulation to the duct wall while the duct may be in motion but also have the ability to readjust if needed prior to final securing by weld pins.

Liquid adhesive is often supplied separately to the installer in either 5 gallon pails or 55 gallon drums. Since the adhesive is supplied as a water-based formulation, it has a limited shelf-life, usually a year or less, and this may be shortened after a pail or drum is opened. Often times, an entire pail or drum may not be used all at once. Frequently opening and resealing of water-based products is a risk due to evaporation and partial curing. This can jeopardize the core properties of the adhesive, such as viscosity, tack, adhesion, etc. In another aspect, the cost of shipping the concentrate versus a ready-to-use liquid adhesive will be lower. Liquid diluent may simply be added prior to use rather than being shipped as part of the finished product from the supplier. This significantly increases the amount of usable product, as much as six times the amount, when comparing to what was actually shipped.

There remains a need for providing adhesive material for installing ductwork that can be easily stored and shipped, and is simple to use by the insulation installer. Here, we disclose an adhesive concentrate ("liquid adhesive concentrate") that is provided to the end-user (e.g., ductwork installer) in a liquid form which can then be combined with water to form a liquid adhesive. In this way, the adhesive can be prepared, as needed, by the end user prior to application during installation according to the specifications (i.e., volume required, adhesive strength) for a particular installation job. The liquid adhesive concentrate provides improved performance and significant cost savings in both raw materials and shipping costs over presently used duct adhesives and is environmentally friendly.

SUMMARY OF THE INVENTION

In some embodiments, a liquid adhesive concentrate is described. The liquid adhesive concentrate may comprise a solid content. In some embodiments, the solid content may comprise a polyvinyl alcohol-stabilized vinyl acetate-ethylene copolymer dispersion in a range from about 50% to about 90%, a dry polymer in a range from about 10% to about 40%, a surfactant in a range from about 0.3% to about 1.2%, a defoamer in a range from about 0.1% to about 0.5%, a biocide in a range from about 0.1% to about 0.3%, a dispersant in a range from about 0.3% to about 1.2%, a plasticizer in a range from about 0.2% to about 3.0%, an anti-freeze in a range from about 0.5% to about 1.5%, or a pH adjuster in a range from about 0.25% to about 0.75%. In some embodiments, the solid content may comprise a polyvinyl alcohol-stabilized vinyl acetate-ethylene copolymer dispersion in a range from about 50% to about 90%, a dry polymer in a range from about 10% to about 40%, a surfactant in a range from about 0.3% to about 1.25%, a defoamer in a range from about 0.1% to about 0.5%, a biocide in a range from about 0.3% to about 1.5%, a dispersant in a range from about 0.3% to about 1.2%. In some embodiments, the liquid adhesive concentrate may further comprise a vinyl acetate-ethylene in a range from about 10% to about 40%. In some embodiments, the solid content is in a range from about 70% to about 80%. In some embodiments, the solid content is in a range from about 70% to about 73%. In some embodiments, the solid content may comprise 80% polyvinyl alcohol-stabilized vinyl acetate-ethylene copolymer dispersion, 0.4% surfactant, 0.3% defoamer, 0.2% biocide, 0.3% dispersant, 0.3% plasticizer, 0.6% anti-freeze, 0.44% pH adjuster, or 18% dry polymer. In some embodiments, the solid content may comprise 80% polyvinyl alcohol-stabilized vinyl acetate-ethylene copolymer dispersion, 1.5% surfactant, 0.3% defoamer, 0.35% biocide, 0.3% dispersant, or 18% dry polymer. In some embodiments, the dry polymer may comprise acrylic, vinyl acetate-ethylene, DP-2903, 2894, CPS 785A, dry latex powders, 5044, 5010, 4016, or a combination thereof. In some embodiments, the surfactant may comprise non-ionic surfactants, ethoxylate-based surfactants, NP-40S, 15-S-7, X-405, EH-9, CO-897, polymeric surfactants, L-101, nonylphenol ethoxylate surfactants, 502W or a combination thereof. In some embodiments, the biocide may comprise 1,2-benzisothiazolin-3-one, 2-methyl-2H-isothiazole-3-one, 5-chloro-2-methyl-2H-isothazol-3-one, zinc pyrithione, 3-iodo-2-propynyl butylcarbamate, tributyltin benzoate, alkyl amine hydrochlorides, Diuron, TN, BIT 20D, BZ Plus, Mergal 174 II, Neuosept 498, Neuosept 91, Neuosept BMc 412, sodium omadine, Sporgard WB, zinc omadine, IPBC 40, Fungitrol 158, Fungitrol 940, or a combination thereof. In some embodiments, the plasticizer may comprise diisononyl phthalate (DINP), dioctyl terephthalate (bis(2-ethylhexyl) benzene-1,4-dicarboxylate (DOTP), benzoate, tricresylphosphate, or a combination thereof. In some embodiments, the anti-freeze may comprise ethylene glycol, propylene glycol, or a combination thereof. In some embodiments, the dispersant may comprise acrylic acid, copolymers of acrylic acid, methacrylic acid, maleic acid, acrylic acid esters, acrylic acid olefins, Rhodoline 225, Coadis 173, Tamol 851, or a combination thereof. In some embodiments, the defoamer may comprise Byk-035, Byk-1610, Byk-019, Byk-023, Byk-025, Byk-1640, Suppressor 2233, Suppressor 2235, Rhodoline 697, or a combination thereof. In some embodiments, the pH adjuster may comprise trimethylamine, diethanolamine, TEA-85, TEA-79, polypotassium triphosphate, pentapotassium triphosphate, and a combination thereof.

In further embodiments, a liquid adhesive formulation is disclosed. The liquid formulation may comprise a solid content of at least about 13%, the solid content comprising, a polyvinyl alcohol-stabilized vinyl acetate-ethylene copolymer dispersion in a range from about 50% to about 90%, a dry polymer in a range from about 10% to about 40%, a surfactant in a range from about 0.3% to about 1.2%, a biocide in a range from about 0.1% to about 0.3%, a dispersant in a range from about 0.3% to about 1.2%, a plasticizer in a range from about 0.2% to about 3.0%, an anti-freeze in a range from about 0.5% to about 1.5%, a pH adjuster in a range from about 0.25% to about 0.75%, a defoamer in a range from about 0.1% to about 0.5% or a thickener in a range from about 1% to about 3%, or water in a range from about 60% to about 80%. In some embodiments, the liquid formulation may comprise a solid content of at least about 13%, the solid content comprising, a polyvinyl alcohol-stabilized vinyl acetate-ethylene copolymer based concentrate in a range from about 18% to about 36%, a defoamer in a range from about 0.1% to about 0.5% or a thickener in a range from about 1% to about 3%, or water in a range from about 60% to about 80%. In some embodiments, the solid content is in a range from about 18% to about 36%. In some embodiments, a ratio of water to solid content is about 6:1, about 5:1, about 4:1, about 3:1, about 2:1, or about 1:1. In some embodiments, the solid content is in an amount of about 18% and the water is in an amount of about 80%. In some embodiments, the thickener is in an amount of about 2%. In some embodiments, the thickener may comprise an anionic inverse emulsion thickener, Texipol 63-237, Texipol 63-253, Texipol 63-202, or a combination thereof.

In a further embodiment, a method for preparing a liquid adhesive concentrate is disclosed. In some embodiments, the method for preparing a liquid adhesive concentrate comprises providing a polyvinyl alcohol-stabilized vinyl acetate-ethylene copolymer dispersion, adding one or more additives to the polyvinyl alcohol-stabilized vinyl acetate-ethylene copolymer dispersion, mixing under low shear conditions to form a mixture, adding dry polymer, and mixing under high shear conditions to form the liquid adhesive concentrate. In some embodiments, the one or more additives may comprise a surfactant, a defoamer, a biocide, a dispersant, a plasticizer, an anti-freeze agent, a pH adjuster, or a combination thereof.

In an additional embodiment, a method for preparing a liquid adhesive formulation is disclosed. In some embodiments, the method may comprise providing a liquid adhesive concentrate having one or more additives, and diluting the liquid adhesive concentrate with water. In some embodiments, the one or more additives may comprise a surfactant, a defoamer, a biocide, a dispersant, a plasticizer, an anti-freeze agent, a pH adjuster, or a combination thereof.

DESCRIPTION OF THE INVENTION

It is to be understood that the descriptions of the invention have been simplified to illustrate elements that are relevant for a clear understanding of the invention, while eliminating for purposes of clarity, other elements that may be well known.

As used herein, the term "about" means the nominal or named value plus or minus 5% of that named value. Before use, the liquid adhesive concentrate may be diluted with water and optionally other components may be added. In some embodiments, a defoamer, a thickener, or a combination of both is added to the final diluted adhesive.

In one aspect, the present invention provides a liquid adhesive concentrate having high solids content. In some embodiments, the solid is a polymeric solid. In another aspect, the present invention provides a method for preparing a liquid adhesive formulation from the liquid adhesive concentrate.

With respect to the solids content, it is believed that upon dilution of the concentrate into the final usable adhesive form, the diluted adhesive should have a minimum solids content of at least about 13% to function as an adhesive having sufficient wet tack and proper dry time. In some embodiments, the solids content is higher than 13%. As one of skill in the art would readily recognize, the solids content (as well as the chemical composition of the solids) in the adhesive may dictate the drying time of said adhesive with higher solids resulting in shorter drying times. One of skill in the art would be able to adjust dilution volumes to achieve an adhesive with desired properties. In some embodiments, the ratio of water to concentrate is about 6:1 or less (e.g., 6:1, 5:1, 4:1, 3:1, 2:1, 1:1, or any ratio in between). In some embodiments, the water and the concentrate are mixed at a ratio of about 82 to about 18.

In order to achieve the desired solids content as noted above and to have maximum versatility in dictating properties of the final diluted adhesive, the liquid adhesive concentrate should have high solids content. However, the viscosity of the concentrate should be such that the concentrate has good flow characteristics and can be easily and homogenously mixed with water. The prepared suspension should also be stable and stay in suspension for an extended period of time. A number of variables, including solids content, identity of concentration, final desired dilution volume, and compatibility with additional desired additives play a substantial role in the final usability of the liquid adhesive concentrate and final adhesive formulation. In some embodiments, the liquid adhesive concentrate has from about 70% to about 80% solids.

In one embodiment, the liquid adhesive concentrate includes a polyvinyl alcohol-stabilized vinyl acetate-ethylene copolymer dispersion. In some embodiments, this dispersion is obtained from Wacker Chemie AG. For example, polyvinyl alcohol-stabilized vinyl acetate-ethylene copolymer dispersions sold under the brand name VINNAPAS® (e.g., EP7000) may be useful. In some embodiments, the concentrate further includes dry polymer and additional performance additives such as surfactant, defoamer, biocide, dispersant, plasticizer, anti-freeze, a pH adjuster, or any mixture or combination thereof. In one embodiment, the solids content in the concentrate is about 70-80%. In one embodiment, this solids content is achieved by using about 50-90% polyvinyl alcohol-stabilized vinyl acetate-ethylene copolymer dispersion having a solids content of about 70-73% and incorporating about 10-40% w/w dry vinyl acetate-ethylene into the concentrate.

The liquid adhesive concentrate may be diluted to prepare the final liquid adhesive formulation. The final liquid adhesive formulation includes the concentrate, water, and other components, such as a defoamer and a thickener, or both. Additionally, other components may be added, inducing those noted above that may be suitable for inclusion in the concentrate.

Within the context of the adhesive formulations disclosed herein, the dry polymer may be acrylic, vinyl acetate-ethylene (VAE), or a combination thereof. Specific examples include DRYCRYL® DP-2903 (DOW), UNIBOND® 2894 (Unichem, Inc.), ELVACE® CPS 785A (H.B. Fuller), dry latex powders (such as those from Dow's DLP line), VINNAPAS® 5044, VINNAPAS® 5010, and VINNAPAS® 4016 (all from Wacker Chemie AG). In particular embodiments, vinyl acetate-ethylene is used.

Within the context of the adhesive formulations disclosed herein, inclusion of one or more surfactants may help to reduce surface tension of the adhesive. Examples of suitable surfactants include, but are not limited to, non-ionic surfactants such as ethoxylate-based surfactants (e.g., TERGITOL® NP-405, TERGITOL® 15-S-7, TRITON® X-405, ECOSURF® EH-9 (all from Dow), IGEPAL® CO-897 (Rhodia), and polymeric surfactants such as PLURONIC® L-101 (BASF) and DOWSIL 502W (Dow). In particular embodiments, nonylphenol ethoxylate (e.g., ECOSURF EH-9® or TERGITOL® NP-40S) and/or polymeric surfactant (e.g., DOWSIL 502W) is used.

Inclusion of one or more biocides may help prevent microbial growth. Examples of suitable biocides include 1,2-benzisothiazolin-3-one, 2-methyl-2H-isothiazole-3-one, 5-chloro-2-methyl-2H-isothazol-3-one, zinc pyrithione, 3-iodo-2-propynyl butylcarbamate, tributyltin benzoate, alkyl amine hydrochlorides, and mixtures thereof. Suitable examples of commercially available biocodes include, but are not limited to, PROXEL® TN (Lonza), Mergal 174 II (Troy), BIOCHECK® BIT 20D (Lanxess), PROXEL® BZ Plus (Lonza), NEUOSEPT™ 498, NEUOSEPT™ 91, NEUOSEPT™ BMc 412 (all by Ashland), Sodium Omadine (Lonza), SPORGARD® WB (Lanxess), Zinc Omadine (Lonza), Polyphase 663 (Troy), BIOBAN® IPBC 40 (Dow Chemical), FUNGITROL® 158, and FUNGITROL® 940 (both sold by ISP Corp.). In particular embodiments, a mixture of 1,2-benzisothiazolin-3-one and 2-methyl-2H-isothiazole-3-one (e.g., PROXEL® TN) is used.

Inclusion of one or more plasticizers may promote flexibility and lower the Tg of the backbone polymer. Examples of suitable plasticizers include, but are not limited to, diisononyl phthalate (DINP), dioctyl terephthalate (bis(2-ethylhexyl) benzene-1,4-dicarboxylate (DOTP), benzoate, tricresylphosphate, or mixtures thereof. Anti-freeze agents may be incorporated to maintain stability during any freeze/thaw cycles that the adhesive may undergo. Examples of suitable anti-freeze agents include ethylene glycol, propylene glycol, and mixtures thereof. Dispersants may be included to help achieve homogenous mixing. Examples of suitable dispersants include, but are not limited to, copolymers of acrylic acid, methacrylic acid, or maleic acid and acrylic acid esters/olefins. Examples of suitable commercially available dispersants include, but are not limited to, RHODALINE® 225 (Solvay Novacare), COADIS® 173 (Coatex), or TAMOL® 851 (Dow Chemical). In some embodiments, the dispersant is RHODALINE® 225.

One or more defoamers may be incorporated to reduce the level of trapped air in the concentrate. In some embodiments, the defoamer is silicone-based, for example, those sold under the BYK®, including BYK® 035, BYK®-1610, BYK®-019, BYK®-023, BYK®-025, BYK®-1640, Supressor 2233 (Hydrite), Suppressor 2235 (Hydrite), and Rhodoline 697 (Solvay). In particular embodiments, BYK®-1610 or BYK®-035 is used.

In particular embodiments, the pH adjuster and the thickener/s are chosen such that the pH adjuster activates the thickener. Suitable pH adjusters include, but are not limited to, trimethylamine, diethanolamine, and mixtures thereof. Specific examples include, but are not limited to TEA-85 and TEA-79. Polypotassium triphosphate (also known as pentapotassium triphosphate) may also be used. In particular embodiments, TEA-85 is used. One or more thickeners may be used to stabilize the end viscosity of the adhesive and keeps solids from falling out of the suspension. In one embodiment, the thickener used is an anionic inverse emulsion thickener. Examples of suitable anionic inverse emulsion thickeners include those that readily congeal in the presence of water under the proper pH conditions, such as those sold under the tradename TEXIPOL® by Scott Bader Company Limited, such as TEXIPOL® 63-237, TEXIPOL® 63-253, AND TEXIPOL® 63-202. In particular embodiments, the thickener is TEXIPOL® 63-237.

In one embodiment, the liquid adhesive concentrate has the following components:
  50%-90% polyvinyl alcohol-stabilized vinyl acetate-ethylene copolymer dispersion
  0.30%-1.20% surfactant
  0.10%-0.50% defoamer
  0.10%-0.30% biocide
  0.30%-1.20% dispersant
  0.20%-3.00% plasticizer
  0.50%-1.50% anti-freeze agent
  0.25%-0.75% pH adjuster
  10%-40% dry polymer In further embodiments, the liquid adhesive concentrate has the following components:
  50%-90% polyvinyl alcohol-stabilized vinyl acetate-ethylene copolymer dispersion
  0.30%-1.25% surfactant
  0.10%-0.50% defoamer
  0.30%-1.5% biocide
  0.30%-1.20% dispersant
  10%-40% dry polymer In particular embodiments, the concentrate has about 80% polyvinyl alcohol-stabilized vinyl acetate-ethylene copolymer dispersion. In particular embodiments, the concentrate has about 0.40% or about 1.25% surfactant. In particular embodiments, the concentrate has about 0.30% defoamer. In particular embodiments, the concentrate has about 0.2% biocide or about 0.35% biocide. In particular embodiments, the concentrate has about 0.30% dispersant. In particular embodiments, the concentrate has about 0.3% plasticizer. In particular embodiments, the concentrate has about 0.60% anti-freeze agent. In particular embodiments, the concentrate has about 0.44% pH adjuster. In particular embodiments, the concentrate has about 18% dry polymer.

In another aspect, the present invention provides a method for preparing a liquid adhesive concentrate. In one embodiment, the concentrate may be prepared by a process that includes the steps of:
  a. providing a polyvinyl alcohol-stabilized vinyl acetate-ethylene copolymer dispersion;
  b. adding one or more additives to the polyvinyl alcohol-stabilized vinyl acetate-ethylene copolymer dispersion;
  c. mixing under low shear conditions to form a mixture;
  d. adding dry polymer; and
  e. mixing under high shear conditions to form the liquid adhesive concentrate.

Within the context of this embodiment, the additives may be any as listed above, for example, surfactant, defoamer, biocide, dispersant, plasticizer, anti-freeze agent, pH adjuster, or any combination thereof. One of skill in the art will readily recognize suitable mixing conditions that will adequately prepare the adhesive concentrate without damaging the polymer structure within the concentrate.

In another aspect, the present invention provides a final adhesive formulation prepared from the liquid adhesive concentrate described herein and methods for its preparation. The final adhesive formulation may be prepared by diluting said liquid adhesive concentrate with water. In some embodiments, this liquid is water. In some embodiments, the liquid adhesive concentrate is diluted at a ratio of 6:1 or less dilution liquid to concentrate. Optionally, as noted above, other components such as a thickener, a defoamer, or a combination thereof, may be added to the final adhesive formulation. In some embodiments, defoamer is added at a final concentration of about 0.1-0.5%. In some embodiments, a thickener is added at a final concentration of about 1.00-3.00%.

In one embodiment, final adhesive formulation has the following components:
a. 60%-80% water
b. 18%-36% liquid adhesive concentrate
c. 0.1%-0.5% defoamer
d. 1%-3% thickener In particular embodiments, the final adhesive formulation has about 80% water and about 18% liquid adhesive concentrate. In particular embodiments, the final adhesive formulation contains about 0.30% additional defoamer. In particular embodiments, the final adhesive formulation contains about 2% of one or more thickener.

Within the context of this embodiment, the final adhesive formulation may be prepared by adding any component in any order, provided that some water is added to the concentrate before defoamer/thickener is added.

In some embodiments, a mixture of defoamer and thickener is prepared separately and added to the concentrate.

In some embodiments, the liquid adhesive formulation may optionally contain a pigment. Pigment may be used as a visual indicator of a variety of properties of the adhesive before, during, or after application, including, but not limited to, extent of drying, application placement, adhesive thickness, or any combination thereof.

Within the context of the invention, the adhesive solution may remain stable without significant sedimentation or significant loss of adhesive efficacy for time period equivalent to that of standard liquid products used in the industry. In some embodiments, the concentrate, once prepared, may exhibit enhanced suspension stability such that upon preparation, it will stay in suspension for a year or more. Further, in some embodiments, adhesive prepared from liquid adhesive concentrate disclosed herein may exhibit quicker drying times compared to other commonly used adhesives while still retaining the ability to remain tacky and allow adjustments before drying. In some embodiments, the adhesive may dry or become tack free within a half hour or an hour while other commonly used adhesives require 1-3 hours or 3-5 hours drying time (dependent on environmental conditions: temperature, humidity, air flow, etc.).

In certain embodiments of the invention, the adhesive solution may be applied to ductwork to which insulation shall be adhered. In other embodiments, the adhesive solution may be applied directly to the insulation itself to provide a protective barrier or to encapsulate exposed insulation fibers. The adhesive solution may be applied to the ductwork or to the insulation by methods well known in the art, for example, by drip system, spray application system, roto-bonder, or brush.

The invention claimed is:

1. A liquid adhesive concentrate, comprising:
a polyvinyl alcohol-stabilized vinyl acetate-ethylene copolymer dispersion in a range from about 75% to about 90% by weight of the liquid adhesive concentrate,
a dry polymer in a range from about 10% to about 18% by weight of the liquid adhesive concentrate,
a surfactant in a range from about 0.3% to about 1.2% by weight of the liquid adhesive concentrate,
a defoamer in a range from about 0.3% to about 0.5% by weight of the liquid adhesive concentrate,
a biocide in a range from about 0.1% to about 1.5% by weight of the liquid adhesive concentrate, and
a dispersant in a range from about 0.3% to about 1.2% by weight of the liquid adhesive concentrate.

2. The liquid adhesive concentrate of claim 1, wherein the dry polymer is vinyl acetate-ethylene.

3. The liquid adhesive concentrate of claim 1, wherein the liquid adhesive concentrate has a solid content in a range from about 70% to about 80%.

4. The liquid adhesive concentrate of claim 1, wherein the liquid adhesive concentrate comprises 80% polyvinyl alcohol-stabilized vinyl acetate-ethylene copolymer dispersion by weight of the liquid adhesive concentrate, 1.2% surfactant by weight of the liquid adhesive concentrate, 0.3% defoamer by weight of the liquid adhesive concentrate, 1.1% biocide by weight of the liquid adhesive concentrate, 0.3% dispersant by weight of the liquid adhesive concentrate, and 18% dry polymer by weight of the liquid adhesive concentrate.

5. The liquid adhesive concentrate of claim 1, wherein the dry polymer is selected from the group consisting of acrylic, vinyl acetate-ethylene copolymer, dry latex powders, and a combination thereof.

6. The liquid adhesive concentrate of claim 1, wherein the surfactant is selected from the group consisting of non-ionic surfactants, ethoxylate-based surfactants, nonylphenol ethoxylate, secondary alcohol ethoxylate, octylphenol ethoxylate, alcohol ethoxylate, polymeric surfactants, polyoxyethylene block copolymer, poly(oxy-1,2-ethanediyl), alpha [3-[1,3,3,3-tetramethyl-1-[(trimethylsilyl)oxy]disiloxanyl]propyl]-omega-hydroxy, and a combination thereof.

7. The liquid adhesive concentrate of claim 1, wherein the biocide is selected from the group consisting of 1,2-benzisothiazolin-3-one, 2-methyl-2H-isothiazole-3-one, 5-chloro-2-methyl-2H-isothazol-3-one, zinc pyrithione, 3-iodo-2-propynyl butylcarbamate, tributyltin benzoate, alkyl amine hydrochlorides, 3-(3,4-dichlorophenyl)-1,1-dimethylurea, hexahydro-1,3,5-tris(2-hydroxyethyl)-s-triazine, 1,2-benzisothiazolin-3-one and zinc pyrithione, pyridine-2-thiol 1-oxide, thiabendazol, azoxystrobin, fludioxonil, and a combination thereof.

8. The liquid adhesive concentrate of claim 1, wherein the dispersant is selected from the group consisting of acrylic acid, copolymers of acrylic acid, methacrylic acid, maleic acid, acrylic acid esters, acrylic acid olefins, acrylic polymer solution anionic dispersant, polyacrylate dispersing agent, polycarboxylic acid, and a combination thereof.

9. The liquid adhesive concentrate of claim 1, wherein the defoamer is selected from the group consisting of paraffin based mineral oils polysiloxane emulsion, polyether modified polydimethylsiloxane, polyamide particles, hyperbranched polymers, mineral oil based defoamer, and a combination thereof.

10. A liquid adhesive formulation, comprising:
a) a liquid adhesive concentrate having a solid content of at least about 13% of the liquid adhesive formulation, the liquid adhesive concentrate comprising,
i) a polyvinyl alcohol-stabilized vinyl acetate-ethylene copolymer dispersion in a range from about 75% to about 90% by weight of the liquid adhesive concentrate,
ii) a dry polymer in a range from about 10% to about 18% by weight of the liquid adhesive concentrate,
iii) a surfactant in a range from about 0.3% to about 1.2% by weight of the liquid adhesive concentrate,
iv) a biocide in a range from about 0.1% to about 1.5% by weight of the liquid adhesive concentrate, v) a dispersant in a range from about 0.3% to about 1.2% by weight of the liquid adhesive concentrate, vi) a defoamer in a range from about 0.3% to about 0.5% by weight of the liquid adhesive concentrate and a thickener in a range from about 1% to about 3% by weight of the liquid adhesive concentrate; and b) water in a range from about 60% to about 80% of the liquid adhesive formulation.

11. The liquid adhesive formulation of claim 10, wherein the solid content is in a range from about 14% to about 36% of the liquid adhesive formulation.

12. The liquid adhesive formulation of claim 10, wherein a ratio of water to solid content is in a range of about 6:1 to about 1:1.

13. The liquid adhesive formulation of claim 10, wherein the solid content is in an amount of about 18% of the liquid adhesive formulation and the water is in an amount of about 80% of the liquid adhesive formulation.

14. The liquid adhesive formulation of claim 10, wherein the thickener is in an amount of about 2% by weight of the liquid adhesive concentrate.

15. The liquid adhesive formulation of claim 10, wherein the thickener is selected from the group consisting of an anionic inverse emulsion thickener, an anionic inverse emulsion as the ammonium salt of an acrylic polymer, and a combination thereof.

16. A liquid adhesive formulation, comprising:
a) a liquid adhesive concentrate having a solid content of at least about 13% of the liquid adhesive formulation, the liquid adhesive concentrate comprising,
   i) a polyvinyl alcohol-stabilized vinyl acetate-ethylene copolymer dispersion in a range from about 75% to about 90% by weight of the liquid adhesive concentrate,
   ii) a dry polymer in a range from about 10% to about 18% by weight of the liquid adhesive concentrate,
   iii) a surfactant in a range from about 0.3% to about 1.2% by weight of the liquid adhesive concentrate,
   iv) a biocide in a range from about 0.1% to about 1.5% by weight of the liquid adhesive concentrate,
   v) a dispersant in a range from about 0.3% to about 1.2% by weight of the liquid adhesive concentrate,
   vi) a defoamer in a range from about 0.3% to about 0.5% by weight of the liquid adhesive concentrate or a thickener in a range from about 1% to about 3% by weight of the liquid adhesive concentrate; and
b) water in a range from about 60% to about 80% of the liquid adhesive formulation.

17. A kit for making a liquid adhesive formulation, the kit comprising:
a) a liquid adhesive concentrate, the liquid adhesive comprising,
   i) a polyvinyl alcohol-stabilized vinyl acetate-ethylene copolymer dispersion in a range from about 75% to about 90% by weight of the liquid adhesive concentrate,
   ii) a dry polymer in a range from about 10% to about 18% by weight of the liquid adhesive concentrate,
   iii) a surfactant in a range from about 0.3% to about 1.2% by weight of the liquid adhesive concentrate,
   iv) a biocide in a range from about 0.1% to about 1.5% by weight of the liquid adhesive concentrate,
   v) a dispersant in a range from about 0.3% to about 1.2% by weight of the liquid adhesive concentrate,
   vi) a defoamer in a range from about 0.3% to about 0.5% by weight of the liquid adhesive concentrate; and
b) a thickener in a range from about 1% to about 3% by weight of the liquid adhesive concentrate.

* * * * *

UNITED STATES PATENT AND TRADEMARK OFFICE
CERTIFICATE OF CORRECTION

| | | |
|---|---|---|
| PATENT NO. | : 11,299,656 B2 | Page 1 of 1 |
| APPLICATION NO. | : 16/535684 | |
| DATED | : April 12, 2022 | |
| INVENTOR(S) | : David Michael Glunt et al. | |

It is certified that error appears in the above-identified patent and that said Letters Patent is hereby corrected as shown below:

In the Claims

Column 8, Line 50, Claim 9, delete "oils" and insert -- oils, --

Signed and Sealed this
Twelfth Day of July, 2022

Katherine Kelly Vidal
*Director of the United States Patent and Trademark Office*